UNITED STATES PATENT OFFICE.

HERBERT SCHLUETER AND CHARLES ZIMMERMANN, JR., OF NEW YORK, N. Y., ASSIGNORS TO NEW PROCESS VARNISH COMPANY, OF NEW YORK, N. Y., A CORPORATION.

MANUFACTURE OF VARNISH.

1,053,652.  Specification of Letters Patent.  Patented Feb. 18, 1913.

No Drawing. Application filed March 27, 1911, Serial No. 617,162. Renewed April 15, 1912. Serial No. 691,002.

*To all whom it may concern:*

Be it known that we, HERBERT SCHLUETER, a subject of the King of Prussia, having declared my intention to become a citizen of the United States, and residing in the borough of Manhattan, city, county, and State of New York, and CHARLES ZIMMERMANN, Jr., a citizen of the United States, residing in the borough of Bronx, city, county, and State of New York, have invented certain new and useful Improvements in the Manufacture of Varnish, of which the following is a specification.

Our process of manufacture is simple, economical and safe, and we attain a free-flowing, neutral, varnish of exceptional elasticity and luster which is not liable to craze and which affords exceptional resistance to chemical and atmospheric influences. All this we attain without the use of either copal, amber or linseed oil heretofore deemed essential in the production of oil varnishes.

Approximately one hundred pounds of resin or a derivative thereof, such as resin oil, is properly heated to evaporate and expel all traces of water, and then treated with say a thirty per cent. mixture of nitric acid (say one part) and sulfuric acid (say twenty parts). This mixture is next washed and then neutralized with anhydrous ammonia, leaving the nitro-sulfo-resinous compound, which may be stored away until wanted, when it can be diluted as required by the use of spirits of turpentine, alcohol, benzin, &c., as may be found most expedient.

The nitric acid lessens the affinity of the sulfuric acid for moisture,—the nitro-sulfureting of the resin or its derivatives being a new and important factor in the manufacture of varnish.

Another step in the process consists in the reduction of a suitable saccharic syrup by evaporation to say approximately four-fifths of its original weight, after which approximately one per cent. of carbolic acid may be added thereto to prevent fermentation. The saccharic syrup may be derived from sugar-cane, corn, or beets, &c.; and as a preparatory step before reduction by evaporation should be allowed to settle to admit of the removal of superfluous sugar crystals.

The third essential to our process is the solvent, for the concentrated and carbolized saccharic syrup. This solvent we prepare by treating say 100 per cent. of seed oil (rape, castor or other seed oil) with nitric and sulfuric acids in the proportions before mentioned, neutralizing the mixture with anhydrous ammonia, as in the case of the nitro-sulfo-resinous compound first described. This nitro-sulfo-seed-oil solvent will combine with and take up, say from twelve to fifteen per cent. more or less of the concentrated carbolized saccharic syrup, and this combination will in turn mix freely with the diluted nitro-sulfo-resinous compound in suitable proportions to form the varnish,—a suitable drier being added if desired.

The nitro-sulfo-seed-oil solvent is a cheap but satisfactory substitute for the boiled linseed or other expensive oils heretofore employed in the manufacture of varnish.

The presence of the sulfur in the varnish, which feature we believe to be entirely new, renders the resultant coating hard and insoluble, enabling it to resist chemical and atmospheric influences; while the presence of the saccharic syrup imparts and maintains a gloss. It also affords a sufficient degree of elasticity to prevent crazing or cracking of surface.

As a matter of fact we attain a light colored, clear, neutral, tough varnish well adapted to all requirements of use, especially for "outside" work. In this connection it may be stated that for "inside" work the well known lime-resin preparation, resin or resin oil melted and heated to about 500° F., and treated with, say 8 per cent. of slaked lime,—the mixture being diluted with turpentine or benzin, may be substituted for our nitro-sulfo-resinous compound if desired, in combination with our carbolized saccharic syrup and nitro-sulfo-seed-oil solvent, with good results.

Our method of manufacture is both cheap, simple and safe. All complicated apparatus is dispensed with, only ordinary pots and pans being essential since boiling under atmospheric pressure only is requisite. Furthermore there are no objectionable or deleterious fumes given out during the process; and the product may be thinned and diluted with wood alcohol,—an important advantage from an economic point of view as related to the use of the varnish.

Being neutral, the product mixes freely with and forms a perfect vehicle for the color introduced into it; and its constituents render it free-flowing, and impart to it a brilliancy of luster.

Although we do not confine ourselves strictly to definite proportions we have found the following formula (which we give by way of illustration) effective and practical, namely:

| | |
|---|---|
| ozs. of nitro-sulfo-seed oil solution containing 15% glucose | 40% |
| ozs. nitro-sulfo-resinous compound | 20% |
| ozs. of lime resin solution | 30% |
| oz. drier | 10% |
| | 100% |

What we claim as our invention and desire to secure by Letters Patent is,

1. As an article of manufacture, a varnish comprising a resinous compound, mixed with a concentrated saccharic syrup diluted with a nitro-sulfo-seed-oil solvent, substantially as described.

2. As an article of manufacture, a varnish consisting of a nitro-sulfo-resinous compound mixed with a concentrated saccharic syrup diluted with a nitro-sulfo-seed-oil solvent, substantially as described.

3. As an article of manufacture, a varnish consisting of a nitro-sulfo-resinous compound mixed with a concentrated carbolized saccharine syrup diluted with a nitro-sulfo-seed-oil solvent, substantially as set forth.

HERBERT SCHLUETER.
CHAS. ZIMMERMANN, Jr.

Witnesses:
GEO. WM. MIATT,
LILLIA MIATT.